US011913786B2

(12) United States Patent
Yuasa (10) Patent No.: US 11,913,786 B2
(45) Date of Patent: Feb. 27, 2024

(54) SURVEYING INSTRUMENT (71) Applicant: TOPCON Corporation, Tokyo-to (JP)

(72) Inventor: Taichi Yuasa, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 731 days.

(21) Appl. No.: 17/062,879

(22) Filed: Oct. 5, 2020

(65) Prior Publication Data

US 2021/0123734 A1 Apr. 29, 2021

(30) Foreign Application Priority Data

Oct. 23, 2019 (JP) ................................ 2019-192484

(51) Int. Cl.
| | |
|---|---|
| G01C 15/00 | (2006.01) |
| G01S 7/481 | (2006.01) |
| G01S 7/4865 | (2020.01) |
| G01S 17/10 | (2020.01) |

(52) U.S. Cl.
CPC .......... *G01C 15/002* (2013.01); *G01S 7/4817* (2013.01); *G01S 7/4865* (2013.01); *G01S 17/10* (2013.01)

(58) Field of Classification Search
CPC ... G01C 15/002; G01S 7/4817; G01S 7/4865; G01S 17/10
See application file for complete search history.

(56) References Cited

U.S. PATENT DOCUMENTS

| | | | | |
|---|---|---|---|---|
| 7,457,224 | B2* | 11/2008 | Hirayama | .......... G11B 7/13922 |
| 10,007,001 | B1 | 6/2018 | LaChapelle et al. | |
| 2005/0168720 | A1 | 8/2005 | Yamashita et al. | |
| 2014/0111618 | A1* | 4/2014 | Kumagai | ................. G01C 1/04 |
| | | | | 348/46 |

(Continued)

FOREIGN PATENT DOCUMENTS

| | | |
|---|---|---|
| EP | 3153879 A1 | 4/2017 |
| JP | 3-175390 A | 7/1991 |

(Continued)

OTHER PUBLICATIONS

European communication dated Mar. 5, 2021 in corresponding European patent application No. 20202946.8.

*Primary Examiner* — Isam A Alsomiri
*Assistant Examiner* — Joseph C Fritchman
(74) *Attorney, Agent, or Firm* — NIELDS, LEMACK & FRAME, LLC.

(57) ABSTRACT

A surveying instrument including a light projecting optical system which projects the distance measuring light, a light receiving optical system which receives the reflected distance measuring light from an object, a frame unit 5 which horizontally rotates around a horizontal rotation shaft, a scanning mirror which is provided in the frame unit, vertically rotates, a horizontal angle detector which detects a horizontal angle of the frame unit, a vertical angle detector which detects a vertical angle of the scanning mirror and an arithmetic control module which calculates the three-dimensional coordinates of the object, in which the light receiving (Continued)

optical system has a reflecting mirror having a reflecting surface which is an off-axis paraboloidal surface or an off-axis free-form surface, and the reflected distance measuring light is configured to be led to a light receiving module by the reflecting mirror while being condensed.

14 Claims, 4 Drawing Sheets

(56) References Cited

U.S. PATENT DOCUMENTS

| | | | |
|---|---|---|---|
| 2015/0153572 A1* | 6/2015 | Miao | G02B 27/017 359/630 |
| 2015/0198433 A1* | 7/2015 | Saint Clair | G01B 9/02027 356/496 |
| 2017/0102454 A1* | 4/2017 | Yuasa | G01S 17/42 |
| 2018/0292514 A1 | 10/2018 | Yoshino | |
| 2018/0306926 A1* | 10/2018 | LaChapelle | H01L 31/1085 |
| 2019/0078883 A1 | 3/2019 | Yuasa et al. | |

FOREIGN PATENT DOCUMENTS

| | | |
|---|---|---|
| JP | 2005-221336 A | 8/2005 |
| JP | 2017-72464 A | 4/2017 |
| JP | 2018-179588 A | 11/2018 |
| JP | 2019-52867 A | 4/2019 |

* cited by examiner

SURVEYING INSTRUMENT

BACKGROUND OF THE INVENTION

The present invention relates to a surveying instrument which can acquire the three-dimensional coordinates of an object.

A surveying instrument such as a laser scanner or a total station has an electro-optical distance measurement device which detects a distance to an object by the prism distance measurement using a reflecting prism as the object or the non-prism distance measurement using no reflecting prism.

A light receiving module of the electro-optical distance measurement device has an optical system including a lens, and the incident light is imaged on a light receiving surface by a refracting action of the lens. An objective lens of the optical system has a focal distance "f", and the focal distance "f" is determined based on the performance required for the electro-optical distance measurement device. For instance, in case of performing the vertical measurement, an aperture of the lens increases to assure a light receiving amount, and a focal distance also becomes longer with an increase in aperture of the lens.

For this reason, the light receiving module of the electro-optical distance measurement device requires a size which enables accommodating the optical system and a length in an optical axis direction which enables assuring the focal distance "f". Therefore, the miniaturization of the light receiving module has been difficult due to the limitation in the size of the optical system and the focal distance.

SUMMARY OF INVENTION

It is an object of the present invention to provide a surveying instrument which miniaturizes an optical system and attains the miniaturization of the entire instrument.

To attain the object as desired, a surveying instrument according to the present invention includes a light projecting optical system which projects the distance measuring light emitted from a distance measuring light source onto a projecting optical axis, a light receiving optical system which receives a reflected distance measuring light from an object and leads the reflected distance measuring light to a light receiving module, a frame unit which horizontally rotates around a horizontal rotation shaft, a scanning mirror which is provided in the frame unit, vertically rotates around a vertical rotation shaft, irradiates the object with the distance measuring light from the light projecting optical system, and receives the reflected distance measuring light from the object by the light receiving optical system, a horizontal angle detector which detects a horizontal angle of the frame unit, a vertical angle detector which detects a vertical angle of the scanning mirror and an arithmetic control module which calculates the three-dimensional coordinates of the object based on a light reception result of the reflected distance measuring light, a detection result of the horizontal angle detector, and a detection result of the vertical angle detector, wherein the light receiving optical system has a reflecting mirror having a reflecting surface which is an off-axis paraboloidal surface or an off-axis free-form surface, and the reflected distance measuring light is configured to be to a light receiving module by the reflecting mirror while being condensed.

Further, in the surveying instrument according to a preferred embodiment, a multilayer film optical element having a predetermined glass thickness is provided on the projecting optical axis, the multilayer film optical element has a first incidence surface which exists at a close position from the distance measuring light source and a second incidence surface which exists at an away position from the distance measuring light source, a beam splitter film which reflects a part of the distance measuring light and transmits a remaining part of the distance measuring light is formed on an incidence portion of the distance measuring light on the second incidence surface, an antireflective film is formed on a portion excluding the beam splitter film, wherein the distance measuring light is configured to be reflected by the beam splitter film, and the reflected distance measuring light is configured to be transmitted through the beam splitter film and the antireflective film.

Further, in the surveying instrument according to a preferred embodiment, a reference light receiving module and an internal reference light optical system which separates a part of the light from the distance measuring light source as the internal reference light and leads the internal reference light to the reference light receiving module, wherein the internal reference light optical system is configured to separate the internal reference light by a beam splitter provided on the projecting optical axis, and the arithmetic control module is configured to calculate a distance to the object based on a time lag between the light reception timing of the reflected distance measuring light and the light reception timing of the internal reference light.

Further, in the surveying instrument according to a preferred embodiment, a reference light receiving module and an internal reference light optical system which separates a part of the light from the distance measuring light source as the internal reference light and leads the internal reference light to the reference light receiving module, wherein the internal reference light optical system is configured to separate the internal reference light by the beam splitter film, and the arithmetic control module is configured to calculate a distance to the object based on a time lag between the light reception timing of the reflected distance measuring light and the light reception timing of the internal reference light.

Further, in the surveying instrument according to a preferred embodiment, a tracking light projecting optical system which deflects the tracking light emitted from a tracking light source coaxially with the distance measuring light, and a tracking light receiving optical system which receives the reflected tracking light from the object and leads the reflected tracking light to an image pickup element, wherein the arithmetic control module is configured to control the frame unit and the scanning mirror based on a light receiving position of the reflected tracking light on the image pickup element in such a manner that the object is tracked.

Further, in the surveying instrument according to a preferred embodiment, a long-pass filter which reflects the infrared light or the near-infrared light and transmits through the visible light is provided on the first incidence surface, the distance measuring light is the infrared light or the near-infrared light, the tracking light is the visible light, and the multilayer film optical element is arranged in such a manner that the second incidence surface is placed on a common optical axis of the distance measuring light and the tracking light.

Further, in the surveying instrument according to a preferred embodiment, the tracking light projecting optical system has a spread angle adjusting module configured to adjust a spread angle of the tracking light, and the spread angle adjusting module is configured to be able to switch between the tracking light having a predetermined spread angle and the laser pointer light which is a parallel light flux.

Further, in the surveying instrument according to a preferred embodiment, an external light reflected by the scanning mirror is configured to enter the image pickup element via the tracking light receiving optical system, and an image having an optical axis of the distance measuring light as a center is configured to be acquired based on the external light which has entered the image pickup element.

Furthermore, in the surveying instrument according to a preferred embodiment, a window glass which rotates integrally with the scanning mirror, wherein the window glass tilts with respect to the optical axis of the distance measuring light.

According to the present invention, a surveying instrument including a light projecting optical system which projects the distance measuring light emitted from a distance measuring light source onto a projecting optical axis, a light receiving optical system which receives a reflected distance measuring light from an object and leads the reflected distance measuring light to a light receiving module, a frame unit which horizontally rotates around a horizontal rotation shaft, a scanning mirror which is provided in the frame unit, vertically rotates around a vertical rotation shaft, irradiates the object with the distance measuring light from the light projecting optical system, and receives the reflected distance measuring light from the object by the light receiving optical system, a horizontal angle detector which detects a horizontal angle of the frame unit, a vertical angle detector which detects a vertical angle of the scanning mirror and an arithmetic control module which calculates the three-dimensional coordinates of the object based on a light reception result of the reflected distance measuring light, a detection result of the horizontal angle detector, and a detection result of the vertical angle detector, wherein the light receiving optical system has a reflecting mirror having a reflecting surface which is an off-axis paraboloidal surface or an off-axis free-form surface, and the reflected distance measuring light is configured to be to a light receiving module by the reflecting mirror while being condensed. As a result, a length in the optical axis direction of the light receiving optical system can be reduced, and the downsizing of the optical system and the downsizing of the entire instrument can be achieved.

DESCRIPTION OF EMBODIMENT

A description will be given on an embodiment of the present invention by referring to the attached drawings.

Figure 1:
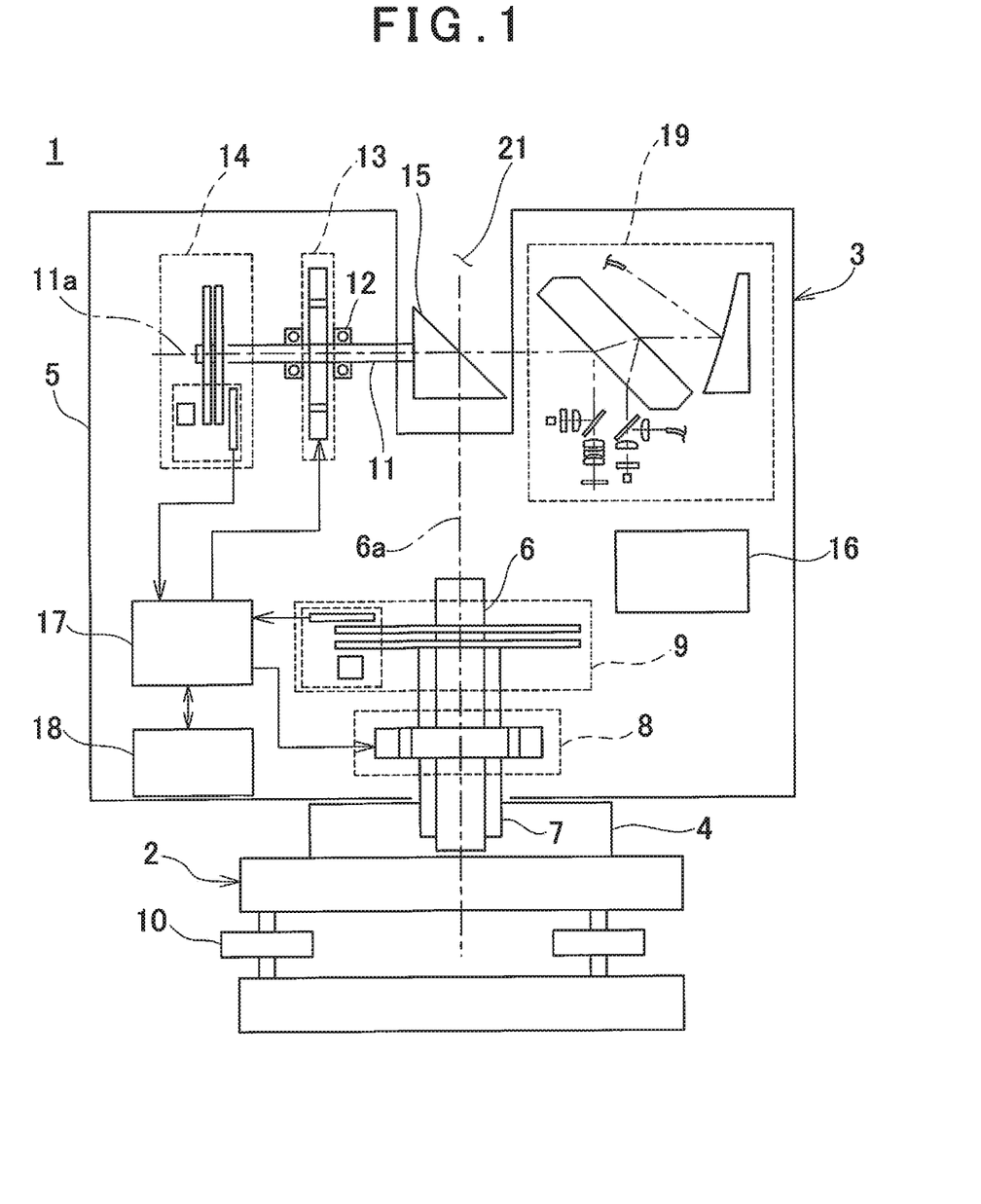
FIG. 1 is a front sectional drawing showing a surveying instrument according to an embodiment of the present invention.

First, in FIG. 1, a description will be given on a surveying instrument according to an embodiment of the present invention.

A surveying instrument 1 is, for instance, a laser scanner, and constituted of a leveling module 2 mounted on a tripod (not shown) and a surveying instrument main body 3 mounted on the leveling module 2. It is to be noted that, as the measurement, the non-prism measurement is carried out.

The leveling module 2 has the leveling screws 10, and the surveying instrument main body 3 is leveled up by the leveling screws 10.

The surveying instrument main body 3 includes a base unit 4, a frame unit 5, a horizontal rotation shaft 6, a horizontal rotation bearing 7, a horizontal rotation motor 8 as a horizontal rotation driving module, a horizontal angle encoder 9 as a horizontal angle detector, a vertical rotation shaft 11, a vertical rotation bearing 12, a vertical rotation motor 13 as a vertical rotation driving module, a vertical angle encoder 14 as a vertical angle detector, a scanning mirror 15 as a vertical rotation module, an operation panel 16 which serves as both an operation module and a display unit, an arithmetic control module 17, a storage module 18, a distance measuring unit 19 and others. It is to be noted that, as the arithmetic control module 17, a CPU specialized for this instrument or a general-purpose CPU is used.

The horizontal rotation bearing 7 is fixed to the base unit 4. The horizontal rotation shaft 6 has a vertical axis 6a, and the horizontal rotation shaft 6 is rotatably supported by the horizontal rotation bearing 7. Further, the frame unit 5 is supported by the horizontal rotation shaft 6, and the frame unit 5 integrally rotates with the horizontal rotation shaft 6 in the horizontal direction.

The horizontal rotation motor 8 is provided between the horizontal rotation bearing 7 and the frame unit 5, and the horizontal rotation motor 8 is controlled by the arithmetic control module 17. The arithmetic control module 17 rotates the frame unit 5 around the axis 6a by the horizontal rotation motor 8.

A relative rotation angle of the frame unit 5 with respect to the base unit 4 is detected by the horizontal angle encoder 9. A detection signal from the horizontal angle encoder 9 is input to the arithmetic control module 17, and the horizontal angle data is calculated by the arithmetic control module 17. The arithmetic control module 17 performs the feedback control of the horizontal rotation motor 8 based on the horizontal angle data.

Further, in the frame unit 5, the vertical rotation shaft 11 having a horizontal axis 11a is provided. The vertical rotation shaft 11 can rotate via the vertical rotation bearing 12. It is to be noted that an intersection of the axis 6a and the axis 11a is a projecting position of the distance measuring light, and the intersection is an origin of a coordinate system of the surveying instrument main body 3.

A recess portion 21 is formed in the frame unit 5. One end portion of the vertical rotation shaft 11 extends to the inside of the recess portion 21, and the scanning mirror 15 is fixed to the one end portion. Therefore, the scanning mirror 15 is accommodated in the recess portion 21.

Further, the vertical angle encoder 14 is provided at the other end portion of the vertical rotation shaft 11. The vertical rotation motor 13 is provided on the vertical rotation shaft 11, and the vertical rotation motor 13 is controlled by the arithmetic control module 17. The arithmetic control module 17 rotates the vertical rotation shaft 11 by the vertical rotation motor 13, and the scanning mirror 15 is rotated around the axis 11a.

A rotation angle of the scanning mirror 15 is detected by the vertical angle encoder 14, and a detection signal is input to the arithmetic control module 17. The arithmetic control module 17 calculates the vertical angle data of the scanning mirror 15 based on the detection signal, and performs the feedback control of the vertical rotation motor 13 based on the vertical angle data.

Further, the horizontal angle data and the vertical angle data calculated by the arithmetic control module 17, the measurement results, the measuring point intervals (to be described later), and the measuring angle intervals (to be described later) are saved in the storage module 18. As the storage module 18, various types of storage devices are used. These storage devices include: an HDD as a magnetic storage device, a CD or DVD as an optical storage device, a RAM, a ROM, a DRAM, a memory card and a USB memory as a semiconductor storage device and other storage devices. The storage module 18 may be attachable and detachable the frame unit 5. Alternatively, the storage module 18 may be configured to enable transmitting the data to an external storage device or an external data processing device via a non-illustrated communicating means.

In the storage module 18 are stored various types of programs are stored. These programs include: a sequence program for controlling the distance measuring operation, a calculation program for calculating a distance by the distance measuring operation, a calculation program for calculating an angle based on the horizontal angle data and the vertical angle data, a calculation program for calculating the three-dimensional coordinates of a desired measuring point based on a distance and an angle, a tracking program for tracking an object, a setting program for setting an interval of the measuring points or an interval of the measuring angles, a spread angle adjustment program for adjusting a spread angle of the distance measuring light or the tracking light (to be described later) and other programs. Further, when the various types of programs stored in the storage module 18 are executed by the arithmetic control module 17, the various types of processing are performed.

The operation panel 16 is, for instance, a touch panel. The operation panel 16 serves as both an operation module which performs, for instance, changing the distance measurement instructions or the measurement conditions such as a measuring point interval or a measuring angle interval and a display module which displays a distance measurement result and the like.

Figure 2:
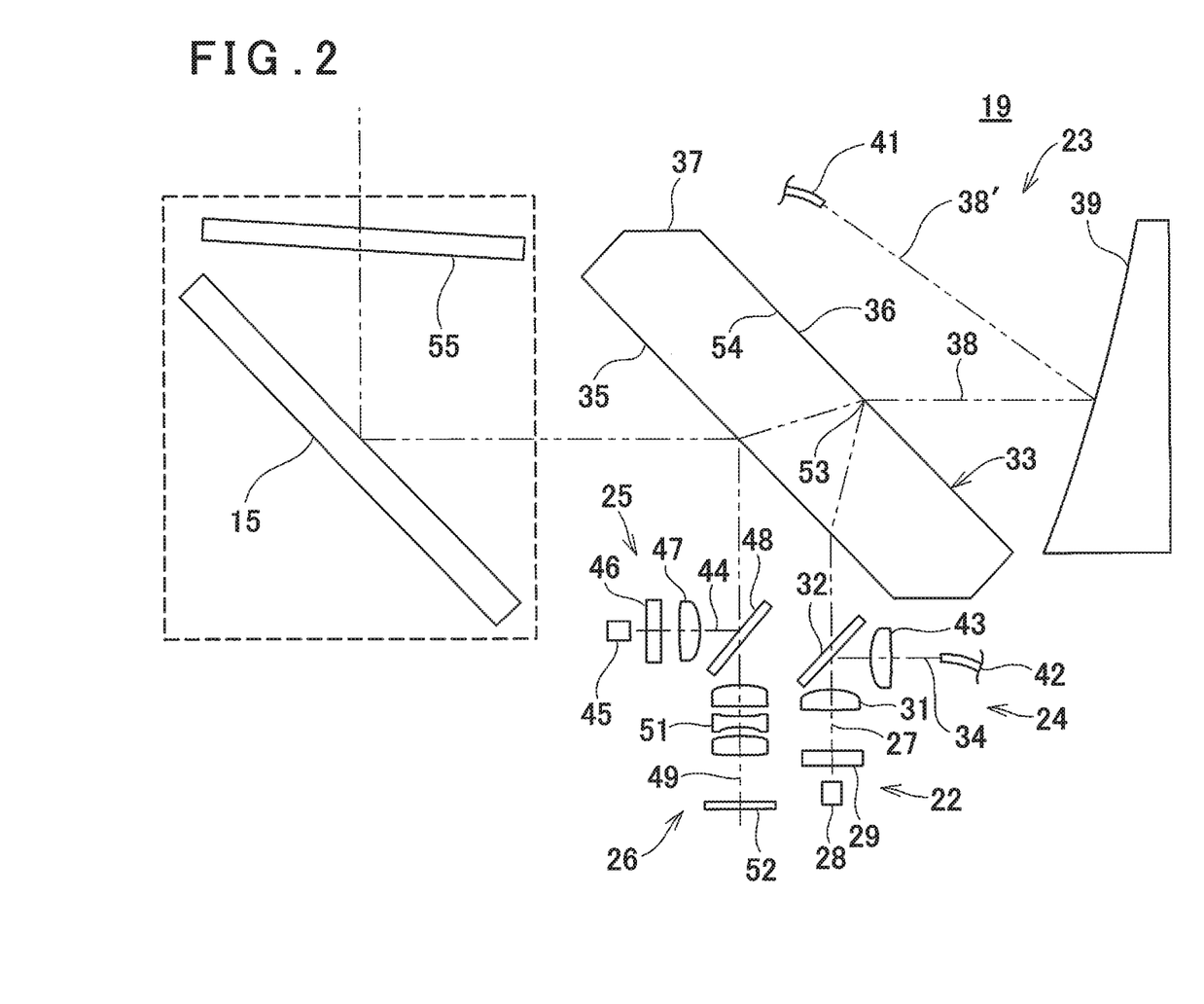
FIG. 2 is a block diagram showing a distance measuring unit according to an embodiment of the present invention.

Next, a description will be given on the distance measuring unit 19 by referring to FIG. 2.

The distance measuring unit 19 mainly has a distance measuring light projecting module 22, a distance measuring light receiving module 23, an internal reference light receiving module 24, a tracking light projecting module 25 and a tracking light receiving module 26.

The distance measuring light projecting module 22 has a projecting optical axis 27 and a light emitter 28, and the light emitter 28 which is a distance measuring light source, for instance, a laser diode (LD) is provided on the projecting optical axis 27. Further, the distance measuring light projecting module 22 has a first plane-parallel plate 29, a light projecting lens 31, a first beam splitter 32 and a multilayer film optical element 33 as a deflecting optical element 33 which are provided on the projecting optical axis 27. It is to be noted that the first plane-parallel plate 29, the light projecting lens 31, the first beam splitter 32 and the multilayer film optical element 33 constitute a light projecting optical system.

The light emitter 28 pulse-emits a laser beam having an infrared or near-infrared wavelength. Alternatively, the light emitter 28 burst-emits the laser beam.

The first plane-parallel plate 29 is, for instance, the tabular glass having a predetermined thickness, and the first plane-parallel plate 29 can be inserted into or removed from the projecting optical axis 27 by a non-illustrated driving mechanism. When the first plane-parallel plate 29 is inserted onto the projecting optical axis 27, a spread angle of the distance measuring light increases. When the first plane-parallel plate 29 is removed from the projecting optical axis 27, the spread angle of the distance measuring light decreases. Therefore, at the time of performing the non-prism distance measurement, the first plane-parallel plate 29 is removed from the projecting optical axis 27, and the distance measuring light having a small beam diameter is used. Further, at the time of performing the prism measurement, the first plane-parallel plate 29 is inserted onto the projecting optical axis 27, and the distance measuring light having a large beam diameter is used.

The first beam splitter 32 has the optical characteristics to reflect approximately 1% of the light and transmit approximately 99% of the light. The first beam splitter 32 deflects (reflects) a part of the laser beam emitted from the light emitter 28 as the internal reference light toward an internal reference optical axis 34 (to be described later), and transmits a remaining greater part of the light therethrough as the distance measuring light.

The multilayer film optical element 33 is, for instance, the tabular glass having a predetermined glass thickness, and the multilayer film optical element 33 tilts at, for instance, 45° with respect to the projecting optical axis 27 The thickness of the multilayer film optical element 33 is approximately 15 mm at the time of, for instance, 40ϕ. Further, one surface (a first incidence surface) of the multilayer film optical element 33 which is provided at a position close to the light emitter 28 is a long-pass filter surface 35. A long-pass filter film which transmits the infrared light or the near-infrared light therethrough and makes reflected the visible light is provided on the long-pass filter surface 35.

Figure 3:
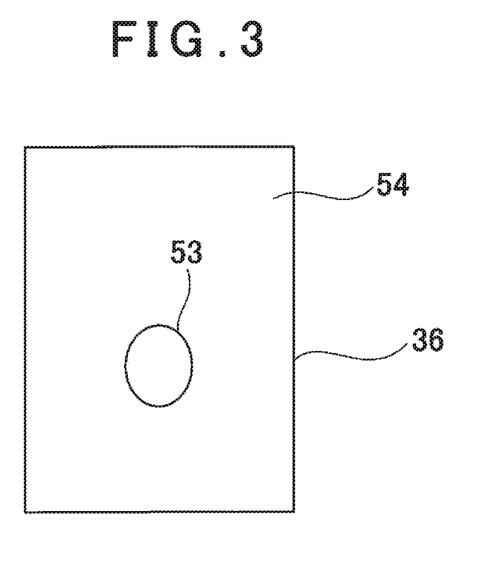
FIG. 3 is a side elevation showing a second incidence surface of a multilayer film optical element of the distance measuring unit.

The other surface (a second incidence surface) of the multilayer film optical element 33 which is provided at a position away from the light emitter 28 is a beam splitter surface 36. A beam splitter film 53 is provided on the beam splitter surface 36. As shown in FIG. 3, the beam splitter film 53 is formed only at a position in the beam splitter surface 36 which the distance measuring light enters. That is, the beams splitter film 53 having an elliptical shape which is substantially the same as a light flux of the distance measuring light is formed on the beam splitter surface 36, and an antireflective film 54 is formed on a portion excluding the beam splitter film 53. The beam splitter film 53 has the optical characteristics to reflect approximately 80% of the light and transmit approximately 20% of the light. Further, on the multilayer film optical element 33, the chamfered portions 37 provided by chamfering the corner portions are formed.

Further, the distance measuring light receiving module 23 has a light receiving optical axis 38, the multilayer film optical element 33, a reflecting mirror 39 and a light receiving module 41. Further, on the light receiving optical axis 38, the multilayer film optical element 33 and the reflecting mirror 39 are provided. Further, on a reflecting optical axis 38' of the reflecting mirror 39, the light receiving module 41, for instance, a light receiving fiber is provided. The light receiving module 41 leads the received light to a photodetector. It is to be noted that the photodetector may be provided at a light receiving position of the light receiving module 41. Further, the multilayer film optical element 33 and the reflecting mirror 39 constitute a light receiving optical system.

The reflecting mirror 39 is an off-axis paraboloidal mirror having a reflecting surface which is an off-axis paraboloid. The reflecting mirror 39 is configured to deflect (reflect) the light receiving optical axis 38 with an off-axis amount of approximately 30° to 60°, for instance, 45° while focusing the reflected distance measuring light.

The internal reference light receiving module 24 has the internal reference optical axis 34, a reference light receiving module 42, a light receiving lens 43 and a first beam splitter 32. On the internal reference optical axis 34, the reference light receiving module 42, for instance, a light receiving fiber, the light receiving lens 43 and the first beam splitter 32 are provided. The reference light receiving module 42 leads the internal reference light to a photodetector. It is to be noted that the first beam splitter 32 and the light receiving lens 43 constitute an internal reference light optical system.

The tracking light projecting module 25 has a tracking projecting optical axis 44. Further, the tracking light projecting module 25 has a tracking light emitter 45, a second plane-parallel plate 46, a light projecting lens 47 and a second beam splitter 48 which are provided on the tracking projecting optical axis 44, and the multilayer film optical element 33 which are provided on a reflecting optical axis of the second beam splitter 48. The tracking light emitter 45 which is a tracking light source is, for instance, a laser diode (LD) which emits the visible light. It is to be noted that the second plane-parallel plate 46, the light projecting lens 47, the second beam splitter 48, and the multilayer film optical element 33 constitute a tracking projecting optical system.

The second plane-parallel plate 46 is, for instance, the tabular glass having a predetermined thickness, and the second plane-parallel plate 46 can be inserted into or removed from the tracking projecting optical axis 44 by a non-illustrated driving mechanism. When the second plane-parallel plate 46 is inserted onto the tracking projecting optical axis 44, a spread angle is adjusted in such a manner that the light emitted from the tracking light emitter 45 becomes the tracking light having a predetermined spread angle. Further, when the second plane-parallel plate 46 is removed from the tracking projecting optical axis 44, the light emitted from the tracking light emitter 45 is projected as the laser pointer light which is a parallel light flux having no spread angle.

Further, the second beam splitter 48 has the optical characteristics to reflect approximately 50% of the light and transmit approximately 50% of the light. Further, the tracking light (the laser pointer light) transmitted through the second beam splitter 48 is deflected (reflected) coaxially with the distance measuring light (onto the projecting optical axis 27) by the long-pass filter surface 35 of the multilayer film optical element 33. That is, the long-pass filter surface 35 is placed on a common optical path of the distance measuring light and the tracking light.

The tracking light receiving module 26 has a tracking receiving optical axis 49. Further, the tracking light receiving module 26 has the multilayer film optical element 33, the second beam splitter 48, a plurality of receiving light lenses 51 constituted of multiple lenses and an image pickup element 52 which are provided on the tracking light receiving optical axis 49. The multilayer film optical element 33, the second beam splitter 48, and the plurality of receiving light lenses 51 constitute a tracking light receiving optical system.

The image pickup element 52 is a CCD or a CMOS sensor which is an aggregation of pixels, and each pixel can specify a position on the image pickup element 52 can be identified. For instance, each pixel has the pixel coordinates having the center of the image pickup element 52 as an origin, and the position on the image pickup element 52 can be specified by the pixel coordinates. The receiving signal and the pixel coordinate output from each pixel are input to the arithmetic control module 17.

In a state where the second plane-parallel plate 46 has been inserted on the tracking projecting optical axis 44, the tracking light projecting module 25 and the tracking light receiving module 26 constitute a tracking module. When the arithmetic control module 17 drives the horizontal rotation motor 8 and the vertical rotation motor 13 based on a light receiving position of the reflected tracking light on the image pickup element 52 and a positional deviation from the center of the image pickup element 52, the object can be tracked.

Further, in a state where the second plane-parallel plate 46 has been removed from the tracking projecting optical axis 44, the tracking light projecting module 25 constitutes a laser pointer irradiating module, and the tracking light receiving module 26 constitutes an image pickup module. The tracking light (the laser pointer light) projected from the tracking light emitter 45 is deflected coaxially with the distance measuring light by the long-pass filter surface 35. Therefore, an irradiating position of the distance measuring light can be confirmed by the laser pointer light. Further, when the external light which has entered via the scanning mirror 15 is received by the image pickup element 52, an image which is coaxial with the distance measuring light (an image having the optical axis of the distance measuring light as a center) can be acquired.

Next, a description will be given on a case where the measurement and the tracking are performed by the surveying instrument 1 having the distance measuring unit 19. It is to be noted that, in the present embodiment, the prism measurement in which a prism having the retroreflective properties is determined as an object. Further, the first plane-parallel plate 29 is inserted onto the projecting optical axis 27, and the second plane-parallel plate 46 is inserted onto the tracking projecting optical axis 44.

The light emitter 28 pulse-emits or burst-emits an infrared or near-infrared laser beam. A diameter of the laser beam is expanded so that a predetermined spread angle is provided in a process of being transmitted through the first plane-parallel plate 29. Then, the laser beam is turned to a parallel light flux by the light projecting lens 31, and enters the first beam splitter 32.

A part of the laser beam which has entered the first beam splitter 32 is reflected onto the internal reference optical axis 34 as the internal reference light. The reflected internal reference light is received by the reference light receiving module 42 via the light receiving lens 43.

Further, a remaining part of the laser beam which has entered the first beam splitter 32 enters the multilayer film optical element 33 as the distance measuring light. The distance measuring light is deflected at the time of being transmitted through the long-pass filter surface 35, and the distance measuring light is reflected on the beam splitter film 53 of the beam splitter surface 36. An optical axis (the projecting optical axis 27) of the distance measuring light reflected on the beam splitter film 53 is deflected in such a manner that the optical axis of the distance measuring light coincides with the axis 11*a* when the distance measuring light is projected from the long-pass filter surface 35. The optical axis of the deflected distance measuring light strikes upon the scanning mirror 15. When the scanning mirror 15 rotates around the axis 11a, the distance measuring light reflected on the scanning mirror 15 at a right angle becomes orthogonal with the axis 11a, and the distance measuring light is rotated (scanned) within a plane including the axis 6a.

The distance measuring light reflected by the object (hereinafter a reflected distance measuring light) strikes upon the scanning mirror 15, and the reflected distance measuring light is reflected (deflected) at a right angle by the scanning mirror 15. The reflected distance measuring light deflected by the scanning mirror 15 is sequentially transmitted through the long-pass filter surface 35 and the beam splitter surface 36. Then, the reflected distance measuring light is reflected and deflected by the reflecting mirror 39, further focused, and received by the light receiving module 41.

Here, the distance measuring light has a predetermined spread angle, and the reflected distance measuring light also has a predetermined spread angle. Therefore, a light flux diameter of the reflected distance measuring light decreases in case of performing the short-distance measurement, and the light flux diameter of the reflected distance measuring light increases in case of performing the long-distance measurement.

For this reason, in case of measuring a long distance, a proportion of the reflected distance measuring light which enters the beam splitter film 53 is slight, and a sufficient light amount can be assured only from the reflected distance measuring light which has been transmitted through the antireflective film 54. On the other hand, in case of measuring a short distance, since a proportion of the reflected distance measuring light which enters the beam splitter film 53 increases, a sufficient light amount cannot be assured only from the reflected distance measuring light which has been transmitted through the antireflective film 54.

In the present embodiment, since a part of the reflected distance measuring light which has entered the beam splitter film 53 is transmitted through the beam splitter film 53, a sufficient light amount can be assured even in case of the short-distance measurement.

It is to be noted that the window glass 55 which integrally rotates with the scanning mirror 15 is provided on the optical axis of the distance measuring light reflected by the scanning mirror 15. The window glass 55 tilts at a predetermined angle with respect to the optical axis of the distance measuring light, and prevents the distance measuring light (the stray light) reflected by the window glass 55 from entering the light receiving module 41.

The distance measuring unit 19 performs the distance measurement for each pulse of the distance measuring light based on a time lag between the light emission timing of the light emitter 28 and the light reception timing of the light receiving module 41 (that is, round-trip time of the pulsed light) and a light velocity (Time of Flight). The light emission timing, that is, a pulse interval of the light emitter 28 is changeable.

Further, the distance measuring unit 19 has the internal reference light receiving module 24. Therefore, by performing the distance measurement based on a time lag between the light reception timing of the internal reference light received by the reference light receiving module 42 and the light reception timing of the reflected distance measuring light received by the light receiving module 41 and the light velocity, the further accurate distance measurement can be performed.

Since the frame unit 5 and the scanning mirror 15 rotate at the constant speeds, respectively, a two-dimensional scan by the distance measuring light is performed by the cooperation between the vertical rotation of the scanning mirror 15 and the horizontal rotation of the frame unit 5. Further, since the distance measurement data (a slope distance) is acquired by the distance measurement for each pulsed light, by detecting a vertical angle and a horizontal angle for each pulsed light by the vertical angle encoder 14 and the horizontal angle encoder 9, the arithmetic control module 17 enables calculating the vertical angle data and the horizontal angle data. The three-dimensional point cloud data corresponding to the object can be acquired based on the vertical angle data the horizontal angle data and the distance measurement data.

Further, in parallel with the distance measurement operation, the tracking light is projected from the tracking light emitter 45. The tracking light is slightly diffused in a process of being transmitted through the second plane-parallel plate 46 and the light projecting lens 47. The diffused tracking light is reflected by the second beam splitter 48, and then strikes upon the multilayer film optical element 33. The tracking light reflected by the long-pass filter surface 35 of the multilayer film optical element 33 is reflected at a right angle by the scanning mirror 15, and irradiated to the object while being diffused.

The reflected tracking light reflected by the object is sequentially reflected by the scanning mirror 15 and the long-pass filter surface 35. The reflected tracking light reflected by the scanned mirror 15 and the long-pass filter surface 35 is sequentially transmitted through the second beam splitter 48 and the plurality of receiving light lenses 51, and enters the image pickup element 52. The arithmetic control module 17 calculates a deviation between the center of the image pickup element 52 and an incidence position of the reflected tracking light, and controls the driving of the horizontal rotation motor 8 and the vertical rotation motor 13 so that the incidence position of the reflected tracking light becomes the center of the image pickup element 52. Thereby, the surveying instrument main body 3 tracks the object.

Further, when the second plane-parallel plate 46 has been removed from the tracking projecting optical axis 44, a measuring point is irradiated with the tracking light as the laser pointer light, and an image having the measuring point as a center can be acquired by the tracking light receiving module 26.

As described above, in the present embodiment, the off-axis paraboloidal mirror having an off-axis amount of approximately 30° to 60° is used as the reflecting mirror provided in the light receiving optical system. For this reason, since the light receiving optical axis 38 can be reflected at an acute angle exceeding a right angle, the light receiving module 41 can be arranged between the multilayer film optical element 33 and the reflecting mirror 39.

Therefore, since a length in the optical axis direction of the distance measuring unit 19 (the light receiving optical system) can be shortened, the optical system of the distance measuring unit 19 can be miniaturized, and the entire surveying instrument can be miniaturized.

Further, the window glass 55 rotated integrally with the scanning mirror 15 tilts with respect to the optical axis of the distance measuring light. Therefore, a measurement error due to the reception of the distance measuring light, which is reflected by the window glass 55, with respect to the light receiving module 41 can be prevented, and a measurement accuracy can be improved.

Further, the insertion or removal of the first plane-parallel plate 29 enables adjusting a spread angle of the distance measuring light. Therefore, it is possible to properly use the non-prism distance measurement adopting the distance measuring light of a small beam diameter and the prism distance measurement adopting the distance measuring light of a large beam diameter.

Further, by the insertion or removal of the second plane-parallel plate 46, the tracking light projecting module 25 and the tracking light receiving module 26 serve both a laser pointer irradiation module and an image pickup module. Therefore, the laser pointer irradiation module or the image pickup module does not have to be additionally provided, and a reduction of the number of components and a decrease in manufacturing cost can be achieved.

Further, a prism or the like having the retroreflective properties can be automatically tracked. Therefore, one worker can perform the tracking and the measurement, and the workability can be improved.

Further, the image pickup element 52 can receive the external light via the scanning mirror 15. Therefore, it is possible to acquire an image of the entire circumference, except for the lower part that is blocked by the frame unit 5.

Further, on the beam splitter surface 36 of the multilayer film optical element 33, a part the distance measuring light enters is the beam splitter film 53. Therefore, the reflected distance measuring light can be transmitted through the beam splitter film 53, and a light receiving amount in the short-distance measurement can be assured.

It is to be noted that, in the present embodiment, by the insertion or removal of the first plane-parallel plate 29 and the second plane-parallel plate 46 each of which is the tabular glass, the changeover between the prism distance measurement and the non-prism distance measurement and the changeover between the tracking light and the laser pointer light are performed. On the other hand, the liquid lenses may be used in place of the first plane-parallel plate 29 and the second plane-parallel plate 46. Changing the focal distances of the liquid lenses enables the changeover between the prism distance measurement and the non-prism distance measurement and the changeover between the tracking light and the laser pointer light without inserting or removing the liquid lenses. The first plane-parallel plate 29, the second plane-parallel plate 46 and the liquid lenses are generically referred to as a spread angle adjusting module.

Further, the tracking light projecting module 25 and the tracking light receiving module 26 may be counterchanged with each other. That is, the tracking light receiving module 26 may be provided on a reflecting optical axis of the second beam splitter 48, and the tracking light projecting module 25 may be provided on a transmitting optical axis of the second beam splitter 48.

Further, in the present embodiment, the tracking light projecting module 25 also serves as a laser pointer irradiating module, but the laser pointer irradiating module may be additionally provided with respect to the tracking light projecting module 25. In this case, when a filter which can receive the invisible light is provided with respect to the image pickup element 52, the tracking light can be the invisible light. Further, the second plane-parallel plate 46 can be omitted.

Further, in the present embodiment, the off-axis paraboloidal mirror is used as the reflecting mirror 39, but an off-axis free-form mirror having a reflecting surface which is an off-axis free-form surface may be used.

Figure 4A:
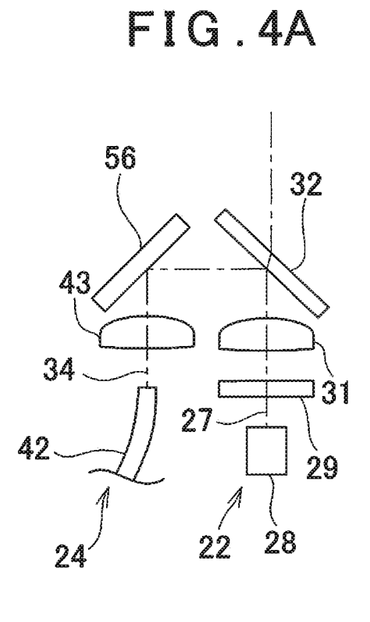
FIG. 4A and FIG. 4B are the block diagrams each showing a modification of a distance measuring light projecting module and an internal reference light receiving module.
Figure 4B:
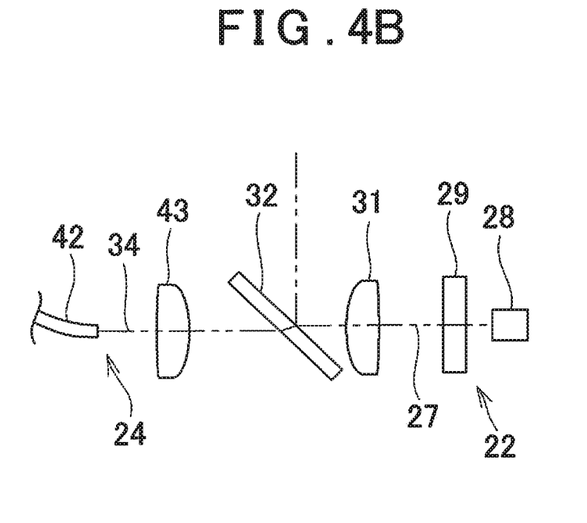

It is to be noted that the distance measuring light projecting module 22 and the internal reference light receiving module 24 are not restricted with respect to the configurations in the present embodiment. For instance, as shown in FIG. 4A, a mirror 56 may be provided on the reflecting optical axis of the first beam splitter 32, and the light receiving lens 43 and the reference light receiving module 42 may be provided on the reflecting optical axis of the mirror 56. Alternatively, as shown in FIG. 4B, the first beam splitter 32 may have the optical characteristics of transmitting approximately 1% of the light and reflecting approximately 99% of the light, and the light receiving lens 43 and the reference light receiving module 42 may be provided on the transmitting optical axis of the first beam splitter 32.

Figure 5:
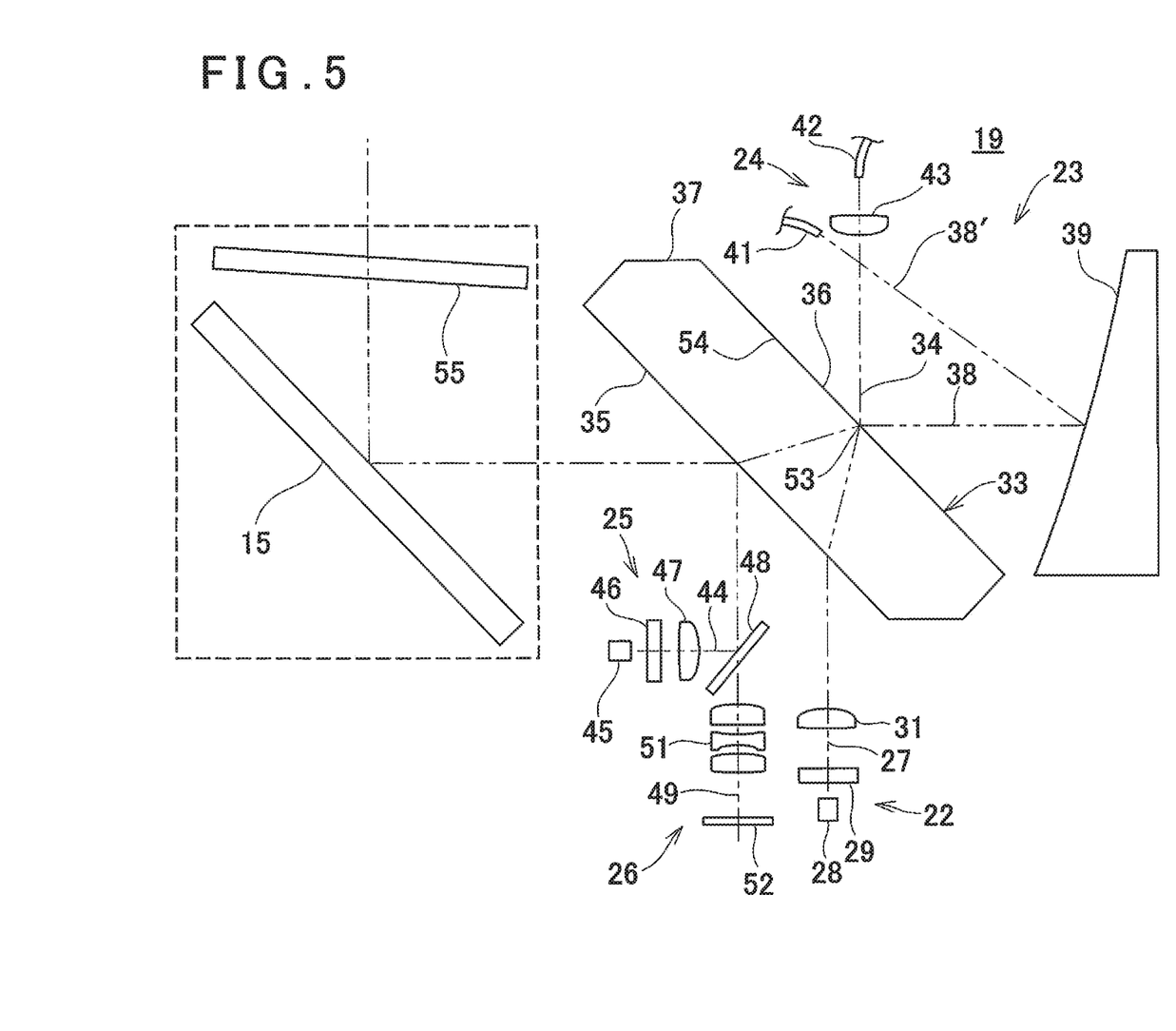
FIG. 5 is a block diagram showing a modification of the distance measuring light projecting module and the internal reference light receiving module.

Further, the distance measuring light projecting module 22 and the distance measuring light receiving module 23 may be configured like a modification shown in FIG. 5.

In the modification of FIG. 5, the light receiving lens 43 and the reference light receiving module 42 are provided on the transmitting optical axis of the beam splitter film 53 of the multilayer film optical element 33. That is, the beam splitter film 53 also serves as the function of the first beam splitter 32.

Therefore, the first beam splitter 32 can be omitted, the number of components can be reduced, and hence the simplification of the instrument structure and a decrease in manufacturing cost can be achieved.

The invention claimed is:

1. A surveying instrument comprising a light projecting optical system which projects a distance measuring light emitted from a distance measuring light source onto a projecting optical axis, a light receiving optical system which receives a reflected distance measuring light from an object and leads said reflected distance measuring light to a light receiving module, a frame unit which horizontally rotates around a horizontal rotation shaft, a scanning mirror which is provided in said frame unit, vertically rotates around a vertical rotation shaft, irradiates said object with said distance measuring light from said light projecting optical system, and receives the reflected distance measuring light from said object by said light receiving optical system, a horizontal angle detector which detects a horizontal angle of said frame unit, a vertical angle detector which detects a vertical angle of said scanning mirror and an arithmetic control module which calculates the three-dimensional coordinates of said object based on a light reception result of said reflected distance measuring light, a detection result of said horizontal angle detector, and a detection result of said vertical angle detector, wherein said light receiving optical system has a reflecting mirror having a reflecting surface which is an off-axis paraboloidal surface or an off-axis free-form surface, and said reflected distance measuring light is configured to be led to the light receiving module by said reflecting mirror while being condensed, wherein a multilayer film optical element having a predetermined glass thickness is provided on said projecting optical axis, said multilayer film optical element has a first incidence surface which exists at a close position from said distance measuring light source and a second incidence surface which exists at an away position from said distance measuring light source, a beam splitter film which reflects a part of said distance measuring light and transmits a remaining part of said distance measuring light is formed on an incidence portion of said second incidence surface, wherein said incidence portion is a portion of said second incident surface where said distance measuring light is incident on said second incidence surface, an antireflective film is formed on a portion of said second incidence surface excluding said incidence portion, wherein said distance measuring light is configured to be reflected by said beam splitter film, and said reflected distance measuring light is configured to be transmitted through said beam splitter film and said antireflective film.

2. The surveying instrument according to claim 1, further comprising a reference light receiving module and an internal reference light optical system which separates a part of the light from said distance measuring light source as the internal reference light and leads said internal reference light to said reference light receiving module, wherein said internal reference light optical system is configured to separate said internal reference light by a beam splitter provided on said projecting optical axis, and said arithmetic control module is configured to calculate a distance to said object based on a time lag between the light reception timing of said reflected distance measuring light and the light reception timing of said internal reference light.

3. The surveying instrument according to claim 1, further comprising a reference light receiving module and an internal reference light optical system which separates a part of the light from said distance measuring light source as the internal reference light and leads said internal reference light to said reference light receiving module, wherein said internal reference light optical system is configured to separate said internal reference light by said beam splitter film, and said arithmetic control module is configured to calculate a distance to said object based on a time lag between the light reception timing of said reflected distance measuring light and the light reception timing of said internal reference light.

4. The surveying instrument according to claim 1, further comprising a tracking light projecting optical system which deflects the tracking light emitted from a tracking light source coaxially with said distance measuring light, and a tracking light receiving optical system which receives the reflected tracking light from said object and leads said reflected tracking light to an image pickup element, wherein said arithmetic control module is configured to control said frame unit and said scanning mirror based on a light receiving position of said reflected tracking light on said image pickup element in such a manner that said object is tracked.

5. The surveying instrument according to claim 4, wherein a long-pass filter which reflects the infrared light or the near-infrared light and transmits through the visible light is provided on said first incidence surface, said distance measuring light is the infrared light or the near-infrared light, said tracking light is the visible light, and said multi-layer film optical element is arranged in such a manner that said second incidence surface is placed on a common optical axis of said distance measuring light and said tracking light.

6. The surveying instrument according to claim 5, wherein said tracking light projecting optical system has a spread angle adjusting module configured to adjust a spread angle of said tracking light, and said spread angle adjusting module is configured to be able to switch between said tracking light having a predetermined spread angle and the laser pointer light which is a parallel light flux.

7. The surveying instrument according to claim 4, wherein an external light reflected by said scanning mirror is configured to enter said image pickup element via said tracking light receiving optical system, and an image having an optical axis of said distance measuring light as a center is configured to be acquired based on the external light which has entered said image pickup element.

8. The surveying instrument according to claim 1, further comprising a window glass which rotates integrally with said scanning mirror, wherein said window glass tilts with respect to the optical axis of said distance measuring light.

9. The surveying instrument according to claim 2, further comprising a tracking light projecting optical system which deflects the tracking light emitted from a tracking light source coaxially with said distance measuring light, and a tracking light receiving optical system which receives the reflected tracking light from said object and leads said reflected tracking light to an image pickup element, wherein said arithmetic control module is configured to control said frame unit and said scanning mirror based on a light receiving position of said reflected tracking light on said image pickup element in such a manner that said object is tracked.

10. The surveying instrument according to claim 3, further comprising a tracking light projecting optical system which deflects the tracking light emitted from a tracking light source coaxially with said distance measuring light, and a tracking light receiving optical system which receives the reflected tracking light from said object and leads said reflected tracking light to an image pickup element, wherein said arithmetic control module is configured to control said frame unit and said scanning mirror based on a light receiving position of said reflected tracking light on said image pickup element in such a manner that said object is tracked.

11. The surveying instrument according to claim 9, wherein a long-pass filter which reflects the infrared light or the near-infrared light and transmits through the visible light is provided on said first incidence surface, said distance measuring light is the infrared light or the near-infrared light, said tracking light is the visible light, and said multi-layer film optical element is arranged in such a manner that said second incidence surface is placed on a common optical axis of said distance measuring light and said tracking light.

12. The surveying instrument according to claim 10, wherein a long-pass filter which reflects the infrared light or the near-infrared light and transmits through the visible light is provided on said first incidence surface, said distance measuring light is the infrared light or the near-infrared light, said tracking light is the visible light, and said multi-layer film optical element is arranged in such a manner that said second incidence surface is placed on a common optical axis of said distance measuring light and said tracking light.

13. The surveying instrument according to claim 11, wherein said tracking light projecting optical system has a spread angle adjusting module configured to adjust a spread angle of said tracking light, and said spread angle adjusting module is configured to be able to switch between said tracking light having a predetermined spread angle and the laser pointer light which is a parallel light flux.

14. The surveying instrument according to claim 12, wherein said tracking light projecting optical system has a spread angle adjusting module configured to adjust a spread angle of said tracking light, and said spread angle adjusting module is configured to be able to switch between said tracking light having a predetermined spread angle and the laser pointer light which is a parallel light flux.

* * * * *